June 28, 1949. J. J. BEAN 2,474,774
HEAVY-MEDIA SEPARATION APPARATUS
Filed June 1, 1945 2 Sheets-Sheet 1
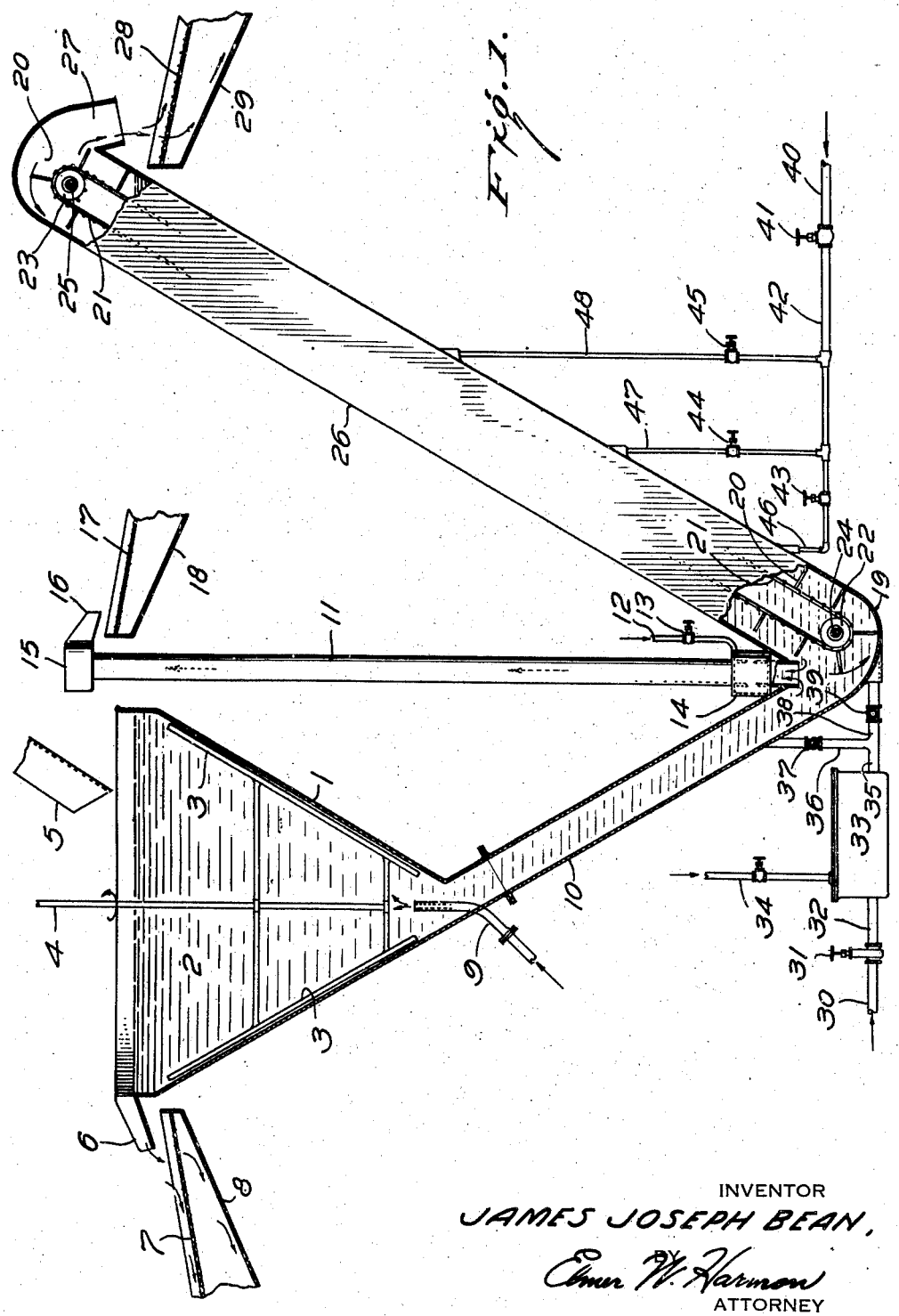
INVENTOR
JAMES JOSEPH BEAN,
Elmer W. Harmon
ATTORNEY

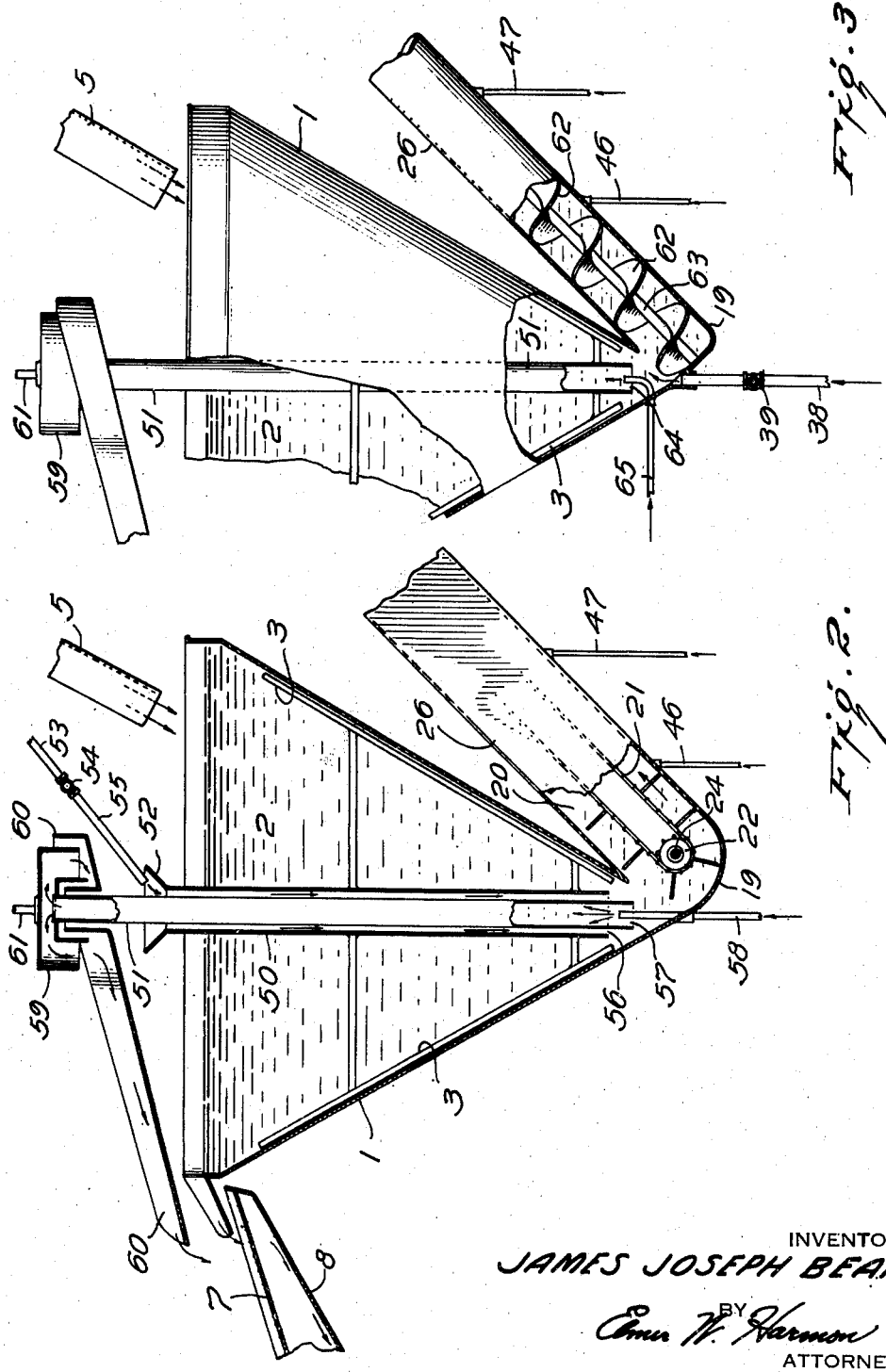

Patented June 28, 1949

2,474,774

UNITED STATES PATENT OFFICE 2,474,774

HEAVY-MEDIA SEPARATION APPARATUS

James Joseph Bean, Riverside, Conn., assignor to American Cyanamid Company, New York, N. Y., a corporation of Maine Application June 1, 1945, Serial No. 596,982

1 Claim. (Cl. 209—173)

This invention relates to the separation of heterogeneous mixtures of solid particles having different densities and contemplates the provision of an improved process and apparatus for effecting such separation. More particularly, the invention relates to a novel apparatus combination used in carrying out the separation and to the method of using the same, whereby two or more solids of different specific gravities, each of which is present in widely different size ranges, may be effectively separated.

Considerable interest has been shown in recent years in the so-called "sink and float" separation of mixtures of solid particles. This field includes a number of different processes for the separation of mixtures of materials by taking advantage of the different settling rates of particles having different specific gravities in a fluid of the proper density. In its simplest form, a mixture of two kinds of solid particles of different specific gravities is immersed in a fluid having a density greater than one solid and less than the other. The mixture is thereby separated into its component parts by the tendency of the more dense materials to sink and the less dense materials to float. Various modifications have been proposed for adapting this separation for use in continuously operating processes.

In the application of these processes, various liquids having a high specific gravity may be employed, but those most commonly used on a commercial scale comprise suspensions fo suitably-sized solids or "medium" in water. A part of the solids is usually colloidal or semi-colloidal in size. Particles in this size range not only remain suspended but also are capable of maintaining the remaining somewhat larger-sized particles in more or less permanent suspension. By properly selecting the solids, fluids of substantially any desirable density can be prepared. Using fluids of properly selected density it is perfectly feasible to separate solids which differ in specific gravity by 0.01–0.05 of a point.

Continuously operating modifications of the process are particularly attractive in the ore-dressing field in the beneficiation of low grade ores. These processes are particularly well adapted to large-scale operation and at the same time operate on a relatively low total cost per unit of product. Consequently, the use of "heavy-media" processes in this field has become comerically very important. Since the practice in ore beneficiation involves these problems which the present invention is intended to solve, it will be taken as illustrative although the process is not necessarily so limited.

Despite the obvious advantages of heavy-media separation it has been considered subject to certain limitations. Industrially, the practice in the past has been more or less limited for economic reasons to the treatment of materials larger than about one-quarter inch, and present in a not too wide range of particle size. Of late, a great deal of investigation has been done to develop a procedure which adapts continuous heavy-media separation to the handling of a wider range of particle sizes. One excellent procedure for this purpose is that set forth in the application for U. S. Letters Patent No. 2,387,866 to G. B. Walker. However, the Walker procedure, and other similar processes, are all primarily concerned only with extending the size range of materials being treated to include finer particles.

This in itself is highly desirable, but it is not a complete solution to the entire problem. In many cases it is desirable to treat mixtures which include not only fines but a relatively large proportion of pieces of from 3 to 6 inches up to a foot or more in size. An excellent illustration, for example, is in the treatment of bituminous coal to reduce the ash content. There the mixture which must be treated varies from extremely large lumps down to and including minus 35 mesh and smaller particles.

Inclusion of large pieces in the feed to a heavy-media separation, if the latter is carried out in the conventional way in a conventional apparatus, increases the operational difficulties and reduces the economic efficiency. Under such conditions the process may become impractical. In any such operation some provision must be made to remove the sink fraction which settles to the bottom of the separatory vessel. Rakes, drags, screw conveyors and the like mechanical lifting devices have been tried in the past and have not been found particularly useful. Particularly is this true when the material being treated is frangible. It increases the amount of small sizes and fines to remove the entire sink product in this way. This in itself is a highly undesirable result. In addition, while appearing advantageous, it is a drawback that such devices remove little separatory fluid from the bottom of the vessel. This failure to check the gradual but steady rise in the fluid density in the lower levels by settling of the suspended medium solids interferes with settling of the fines and near-gravity material which should form part of the sink product.

In order to overcome this difficulty, most conventional apparatus is equipped with an air-lift connected to the bottom of the separatory vessel rather than a mechanical lifting arrangement. Within its limitations this is an excellent arrangement, easily operated, having no moving parts, and being quite economical to operate. It does move considerable separatory fluid from the bottom of the vessel and prevents excessive density increase therein and the resultant clogging of the vessel with fine sink and near-gravity middlings. However, it has definite limitations. If the sink material to be carried out and up contains pieces which are too large, the operation becomes very inefficient. In the first place, the air consumption to move the weight and the amounts of heavy-media fluid carried through the system become excessive. Further, because of this excessive fluid circulation, the desired flow conditions in the separatory vessel become badly upset.

There remains then a need for a process and/or a suitable apparatus for carrying out an ordinary heavy-media separation or an improved process such as that of the above-identified Walker patent, which will enable handling large pieces in the feed without being subject to these difficulties. It is, therefore, the principal purpose of the present invention to develop such a procedure. It is also an object of the invention to devise an improved apparatus combination suitable for carrying out the process steps.

In general, the objects of the present invention are accomplished by a novel modification of the process and apparatus used in heavy-media separation. Provision is made for the inclusion of even the larger, naturally-occurring pieces in the feed. These pieces, when they comprise a portion of the float fraction, create no difficulty. When comprising a portion of the sink product, provision is made for their separate removal from a low point in the separatory apparatus at which the total sink product accumulates. An air-lift is provided as in the conventional apparatus. It is used in practice for removing not only the medium but smaller sizes for which it is best adapted and the size-reduction of which is undesirable.

The invention will be more fully described in conjunction with the accompanying illustration in which:

Figure 1 is an elevation partly in section of an apparatus combination embodying the features of the present invention;

Figure 2 is an elevation partly in section of another modification of an apparatus suitable for carrying out the present invention;

Figure 3 is also an elevation partly in section of a still further modification showing a different means for removing large pieces.

As shown in Figure 1, the process of the present invention is carried out in a separatory vessel represented by cone 1 which is filled with a heavy-media separatory fluid 2 and equipped with conventional rakes 3 mounted on a central, vertical shaft 4, and turned by the rotation of the latter by some conventional means which forms no part of the present invention. The vessel is equipped with the usual feed chute 5 for the introduction of the solid particles to be treated. Although not a part of this invention some makeup fluid is ordinarily used to prewet these particles and introduced into the system therewith in the conventional manner, as shown for example in U. S. Letters Patents Nos. 2,176,189 and 2,379,184. The cone also is provided with the usual overflow weir 6 near the top by which the float fraction is carried over and on to a draining and/or washing screen 7. The latter is provided with a drain pan 8, or the like which forms part of the medium recovery and reuse circuit with which the present invention is not concerned. Preferably, a system such as described in the above identified patent to Walker is used, particularly if very small particles are included in the feed size range.

As shown in Figure 1, the necessary provision for introducing separatory fluid into the separatory vessel is met by a conduit 9, near the apex or low point of the cone itself, through which medium of the correct density is introduced into the cone proper. Also more or less in a conventional manner, a conduit 10 for the removal of the sink fraction extends outwardly and downwardly from the apex of the cone for a sufficient distance to permit removal of the sink fraction therefrom. Conduit 10 differs from similar conventional conduits, being much larger than normal since it is of sufficient cross-section to permit ready passage of the largest pieces which are to be included in the feed.

So much of the apparatus is substantially conventional in form. The novel features of the present invention comprise the method and apparatus for handling the sink product which settles to the bottom of the separatory vessel. In the modification illustrated in Figure 1, it passes out of the cone through conduit 10. A vertical conduit 11, near the bottom of which air is admitted through conduit 12, valve 13, and collar 14, serves as an air-lift for removing that portion of the sink fraction in the size range normally handled in previous heavy-media separation, i. e., those sizes which can be handled in the air lift without excessive air consumption or excessive circulation of fluid. This portion, as shown in Figure 1, is discharged into a chamber 15 at the top of conduit 11, flows down a short troth 16 and onto a washing and/or draining screen 17 which, like screen 7, is equipped with the usual collecting pan 18 for the recovery of the medium, again the particular system of medium recovery chosen not being a feature of the present invention.

However, it will be noted that conduit 10 does not connect directly and solely into the lower end of air-lift conduit 11 as in a conventional apparatus. Rather, conduit 10 delivers the sink fraction into a sump chamber 19 which comprises the low point in the system. The air-lift draws from the sump that portion of the sink fraction which it is intended to handle. The remainder, comprising essentially the large pieces, is carried up and out of the sump by means of a mechanical conveyor. This conveyor may be any one of several equivalent types. In Figure 1 it is shown as a drag comprising a plurality of blades 20 on endless belts 21 which pass over pairs of pulleys 22 and 23 mounted respectively on shafts 24 and 25, shaft 25 being driven by some conventional power source to motivate the system. Since the drag must operate under fluid it is enclosed in a shell 26 of sufficient length to offset the fluid head in conduit 10 and cone 1. Pieces carried up and out by the drag are discharged near the top of shell 26 through opening 27 onto a draining and/or washing screen 28. The latter also is equipped with a collecting pan 29, screen 28 and pan 29 again forming part of the medium recovery system, an auxiliary circuit with which the present invention is not concerned.

Once the sink fraction has settled to the bottom of the separatory vessel 1 its further drop through conduit 10 may be hastened by having the fluid in conduit 10 of lesser density and viscosity than in the cone itself. Provision for accomplishing this may be readily made, as for example as shown in Figure 1. Dense medium is brought to the system through a conduit 30 from any suitable source and introduced through valve 31 and conduit 32 into a specific gravity controller 33 of conventional design into which water is also introduced through conduit 34. Fluid of the desired density is discharged through conduit 35 and may be introduced directly into conduit 10 by means of conduit 36 and valve 37, or into the bottom of the sump chamber through conduit 38 and valve 39, or both. This has the additional important advantage of aiding accurate control of the downflow of separatory fluid in conduit 10. The fluid introduced through conduit 36 and/or 38 will be that which is preferentially taken into the air-lift conduit 11. The adjustment of the flow in conduits 11, 37 and 38, therefore, will aid in determining and maintaining the flow leaving the separatory vessel 1 through conduit 10. The latter is important in regulating the amount of fluid actually recycled in the separatory vessel as a means of preventing too great an increase in apparent fluid density at the bottom of the vessel.

Similarly for ease in handling, to save on the amount of medium required to fill the system and to help control the tendency of medium to flow down conduit 10 from cone 1, it may be desirable to introduce fluid of lighter gravity or even water into shell 26. As shown in Figure 1, provision is made for accomplishing this at a plurality of points. Low-gravity fluid or water is brought into the system through conduit 40, valve 41 and conduit 42 and distributed as necessary through valves 43, 44, and 45 and conduits 46, 47 and 48.

The operation of the apparatus is believed to be clearly apparent from its structure. The feed, including the whole size range is introduced into the separatory fluid in the cone. The float fraction accumulates at the top of the separatory fluid and passes out of the system. The sink product accumulates at the bottom of the cone and is carried out of the system into a collecting pocket which forms the low point in the system. From the latter, the largest pieces together with as much of the smaller pieces as is necessary or convenient are carried up and out by a mechanical conveying system. This moves but little separatory fluid. Lifting of separatory fluid and the smaller pieces is accomplished by an air-lift.

The procedure while appearing simple has a number of advantages. It permits handling of feed including very large sizes. It permits collecting the large sizes as a separate product, which is usually desirable. It permits collecting of the sink product in the usual size range by an air-lift which is operating under efficient conditions. It cuts down the amount of medium which would have to be recycled if the largest pieces were handled in the usual way by providing an air-lift of sufficient capacity to handle all the sink. It prevents any abnormal disturbance of the fluid flow conditions in the cone which would occur if the very large conduit 10 was directly connected to an air-lift handling very large pieces. On the other hand, it permits circulating a sufficient amount of separatory fluid which is not accomplished when using a mechanical lifter alone. It prevents the degradation in size to produce excessive fines which occurs if a mechanical lifter is used to remove the entire sink fraction. Any breaking of larger pieces by the action of the drag results only in the production of pieces, substantially all of which are still larger than the small pieces of a normal sink fraction handled by the usual practice.

A useful modification of the apparatus, operating on the same general principle but eliminating the necessity for the long conduit 10, and appreciably reducing the necessary length of conveyor shell 26 is shown in Figure 2. As will be seen, there is the usual cone, fluid, sweeps and float fraction overflow. Conduit 10 has been eliminated by directly attaching sump chamber 19 to the apex of cone 1. Large pieces are removed by a drag identical except for length with that shown in Figure 1.

The air-lift, however, has been slightly modified. Instead of being located externally of the cone, it extends vertically upward through the center thereof. An outer conduit 50 and an inner conduit 51 are concentrically located about the vertical axis of the cone, the top of outer conduit 50 being slightly flared to produce a funnel 52. Medium is introduced into funnel 52 through conduit 53, valve 54 and conduit 55 and flows downward in the annular space between conduits 50 and 51, being discharged near the bottom thereof through the open bottom end 56. Inner conduit 51 is provided near its open lower end 57 with an air jet 58 by which it is converted into an air-lift. The portion of the total sink fraction up to the maximum size which can be pumped efficiently with an air-lift is drawn upward from sump 19 through conduit 51 and is discharged therefrom through baffled hood 59 into launder 60 by which it is carried to and discharged on the usual draining and/or washing screen. Rotation of sweeps 3 is provided by suspending hood 59, conduits 51 and 50 and the sweeps themselves from a vertical shaft 61 which is rotated by any desired conventional driving means, not shown. As in Figure 1, provision is made for introducing lower gravity fluid or water through conduits 46, 47, etc., into the drag casing 26.

This modification requires a very careful mounting of the air-lift and the medium distribution conduit. On the other hand, this is more than offset by the tremendous reduction in the amount of fluid required to fill the system and to be circulated therein. Its mechanical connections are different from those of the modification in Figure 1 but the operating elements serve the same purpose and the operation is clearly apparent.

A still further modification, combining features of both Figures 1 and 2 is shown in Figure 3. The most notable distinction is that the drag of those modifications has been replaced by a conveyor screw 62 mounted on a rotating shaft 63 which in turn is motivated by some conventional driving means. As in Figure 2, removal of the smaller size fraction is up through the cone. A conduit 51 extends up concentrically with the vertical axis of cone 1 and, by the introduction of air into its open end 64 from jet 65, operates as an air-lift. The outer conduit of Figure 2 has been omitted. Conduit 51 and its discharge hood 59 are rotated, being suspended directly from the shaft 61 as in Figure 2, the sweeps 3 are directly mounted on conduit 51. Admission of medium into the low part of the cone is, as in Figure 1, through conduit 38 and valve 39. As in Figures 1 and 2, provision is made for introducing lower gravity fluid or water into conveyor casing 26 through conduits 46 and 47.

It will be apparent from the foregoing discussion that the various elements of the present invention, both as to the procedure and the apparatus, may be varied without departing from the scope thereof. The essential features are a separatory vessel; means for introducing feed including large sizes thereto; means for removing the float fraction; means for introducing separatory fluid near the bottom of the vessel to make up for loss in the float overflow and/or create a rising current; a sump at a low point in the system in which the total sink fraction is accumulated; a mechanical means for withdrawing the larger sink pieces from the sump; and an airlift for removing the remainder of the sink product and circulating sufficient separatory fluid to prevent development of an increased density at the bottom of the vessel which would otherwise interfere with the settling of the fines and middlings. Preferably, it is desirable to reduce the density of the separatory fluid in the sump itself and still further reduce it in the mechanical conveyor system in which the larger pieces are removed. It is also practically desirable to be able to introduce fluid of the correct separating density at a low point in the separatory vessel to compensate in part for the fluid to be removed in the air-lift and by the mechanical lifting means. So long as these features are present, each of the individual elements may be varied as to their exact nature and physical relation with respect to each other.

Similarly in the process, certain elemental steps are essential to the practice of the invention and the means by which they may be carried out may be quite widely varied. The essential process steps including immersing a feed in a wide size range into a separatory fluid of the correct density to effect separation of the light fraction which floats and the heavier fraction which sinks. It is necessary to remove the float fraction as it accumulates at or near the liquid surface. It is necessary to collect the sink fraction at a hydraulically lower level than that at which the float is removed. It is necessary to remove the medium sizes and smaller sizes of sink fraction from the sink product by some means which does not cause appreciable decrepitation of the particles. It is necessary to remove the larger sizes by some procedure which does not upset the fluid flow conditions in the separatory vessel. It is preferable to reduce the fluid density at desirable points in the removal of the larger pieces. Additional steps may be added if so desired. Precautions to enable handling fine size feed for example may be added. Medium recovery and reuse may be varied with the exact nature of the media solids used. However, these additional steps are not essential to the particular improvement of the present invention.

I claim:

In a heavy media separation process in which a mixture of particles of differing specific gravities is continuously introduced into a main body of aqueous separatory fluid, said fluid having suspended therein sufficient finely divided solids to produce in the fluid in the zone in which separation takes place an apparent average density intermediate those of the particles to be separated, whereby a more dense fraction sinks and a less dense fraction floats, the float fraction being overflowed; the improved method of treating a feed containing sink particles ranging in size from fines through large pieces which comprises: continuously collecting the entire sink fraction at a hydraulic level below the fluid separatory zone; continuously adding to the main body of separatory fluid, intermediate said separatory zone and said hydraulic level, sufficient make up fluid to maintain hydraulic equilibrium in said separatory zone; continuously adding aqueous fluid media of less average apparent density than that in said separatory zone to the collected sink fraction at said hydraulic level; continuously raising, with an air lift, fluid media together with that portion of the finer-sized particles in said sink fraction as moves therewith, from said hydraulic level to a level above said main body; adjusting the rate of said air lift fluid raising with respect to the rate of fluid addition at said hydraulic level to maintain an apparent average fluid density in the lowest levels of said main body less than the apparent average fluid density in said separatory zone; holding said rates substantially constant; maintaining the depth of a secondary fluid body extending upwardly from and in open communication with the fluid at said hydraulic level sufficient to hold said secondary body in hydraulic balance with said main body of fluid, continuously raising by mechanical means the remaining portion of the collected sink fraction from said hydraulic level through said secondary fluid body to a level above the top thereof and collecting said separately raised sink fractions.

JAMES JOSEPH BEAN.

REFERENCES CITED

The following references are of record in the file of this patent:

UNITED STATES PATENTS

| Number | Name | Date |
|---|---|---|
| 2,113,609 | Wuensch | Apr. 12, 1938 |
| 2,347,264 | Holt | Apr. 25, 1944 |
| 2,360,129 | Hebbard | Oct. 10, 1944 |
| 2,379,184 | Rakowsky | June 26, 1945 |

FOREIGN PATENTS

| Number | Country | Date |
|---|---|---|
| 465,126 | Great Britain | Apr. 30, 1937 |